(12) United States Patent
Schöttler et al.

(10) Patent No.: US 6,920,760 B2
(45) Date of Patent: Jul. 26, 2005

(54) DEVICE AND METHOD FOR PREHEATING COMBUSTIBLES IN COMBINED GAS AND STEAM TURBINE INSTALLATIONS

(75) Inventors: Michael Schöttler, Erlangen (DE); Erich Schmid, Marloffstein (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 10/399,515

(22) PCT Filed: Oct. 12, 2001

(86) PCT No.: PCT/EP01/11842

§ 371 (c)(1),
(2), (4) Date: Apr. 17, 2003

(87) PCT Pub. No.: WO02/33225

PCT Pub. Date: Apr. 25, 2002

(65) Prior Publication Data

US 2004/0011019 A1 Jan. 22, 2004

(30) Foreign Application Priority Data

Oct. 17, 2000 (EP) .......................... 001226026

(51) Int. Cl.[7] .............................................. F02C 7/224
(52) U.S. Cl. ..................... 60/772; 60/39.182; 60/736
(58) Field of Search ............................. 60/39.182, 772, 60/736

(56) References Cited

U.S. PATENT DOCUMENTS 6,269,626 B1 * 8/2001 Kim ........................ 60/39.182

FOREIGN PATENT DOCUMENTS

| DE | 4321081 | 1/1995 |
| EP | 0588392 | 3/1994 |
| EP | 0931911 | 7/1999 |

* cited by examiner

Primary Examiner—Louis J. Casaregola
(74) Attorney, Agent, or Firm—Harness, Dickey & Pierce, P.L.C.

(57) ABSTRACT

A device is for preheating combustibles in combined gas and steam turbine installations. The device includes at least one steam generator for heating, evaporating and superheating feed water, which has a feed water preheater, an evaporator and a superheater. At least part of the heated feed water is used for preheating combustibles in a combustible preheater, which can be supplied with feed water of a predetermined temperature by a feed water supply line. Once the combustible has been heated, the cooled feed water can be drained using a feed water drain line. The device is configured so that it can be used in different gas turbine installations and its heating capacity can be rapidly and cost-effectively adapted to predetermined combustible preheating requirements. To achieve this, the combustible is preheated in stages, which can be activated individually as required and through which the combustible can successively pass.

20 Claims, 6 Drawing Sheets

DEVICE AND METHOD FOR PREHEATING COMBUSTIBLES IN COMBINED GAS AND STEAM TURBINE INSTALLATIONS

This application is the national phase under 35 U.S.C. § 371 of PCT International Application No. PCT/DE01/11842 which has an International filing date of Oct. 12, 2001, which designated the United States of America and which claims priority on European Patent Application number EP 00122602.6 filed Oct. 17, 2000, the entire contents of which are hereby incorporated herein by reference.

FIELD OF THE INVENTION

The invention generally relates to a device for fuel preheating in combined gas and steam turbine installations. Preferably, it includes at least one steam generator for the heating, evaporation and superheating of feedwater. The steam generator preferably includes a feedwater preheater or condensate preheater, an evaporator and a superheater. At least part of the heated feedwater is preferably capable of being used for the preheating of fuel. Further, the fuel preheater is capable of being supplied with feedwater having a predetermined temperature by way of a feedwater delivery line. Further, after the heating of the fuel, the cooled feedwater is preferably capable of being discharged by way of a feedwater discharge line.

BACKGROUND OF THE INVENTION

For the provision of steam for driving a steam turbine, feedwater is heated, evaporated and superheated under high pressure. This takes place, as a rule, in a plurality of steam generator stages. As a rule, this take place in a low-pressure steam generator stage, a medium-pressure steam generator stage and a high-pressure steam generator stage. The steam generator stages include a feedwater preheater or condensate preheater, in which the feedwater, which is supplied by a feedwater pump, is heated to boiling temperature before entry into a drum assigned to the respective pressure stage and is partially also evaporated. This is done in an evaporator, which is connected to the respective drum and in which saturated steam is generated. A superheater is connected to the steam region of the drum, for supplying heat to the saturated steam, without an increase in the pressure of the saturated steam. It is then subsequently conducted to a part of the steam turbine which corresponds to the respective steam pressure (low-pressure, medium-pressure and high-pressure turbine part).

In a combined gas/steam turbine plant, the supply of heat to the steam generator stages takes place by use of the hot exhaust gases from a gas turbine. In addition, in the medium-pressure steam generator stage, the exhaust steam obtained from a high-pressure turbine part is admixed, in turn, to the superheated medium-pressure steam. It is heated once more in an intermediate superheater, in order thereafter to be supplied to the medium-pressure turbine part. Alternatively to delivery to the corresponding steam turbine part, the steam may also be conducted into a steam turbine condenser, from where the water/steam circuit is closed by a condensate pump pumping to the condensate preheater again the condensate which is formed in the condenser.

For the provision of energy for generating gas for the gas turbine or additional heat for the steam generators of the steam turbine in a combined gas/steam turbine plant, fuel, for example natural gas, is burnt. In order to make this combustion effective, the fuel is previously heated. The preheating of the fuel takes place by way of a fuel preheater. For this purpose, for example, part of the already heated medium-pressure feedwater is branched off downstream of the medium-pressure feedwater preheater, before entry into the medium-pressure drum, is led past the fuel by the heat exchanger method and is delivered to the water/steam circuit again between the condensate pump and the condensate preheater. In this case, the fuel reaches temperatures of up to 200° C. Alternatively, medium-pressure feedwater is branched off even before entry into the medium-pressure feedwater preheater, fuel temperatures of about 140–160° C. being reached.

One disadvantage of this is that the fuel preheater must have a high pressure rating, with the result that it is sensitive toward temperature changes and is costly to produce and maintain. Moreover, even in modern gas turbine plants, the possible preheating of the fuel up to 200° C. can scarcely be utilized. This occurs since, in the case of higher preheating, there is, for example, the problem of what may be referred to as "combustion chamber humming", so that it has hardly been possible hitherto to use the installed costly preheating systems.

SUMMARY OF THE INVENTION

An object of an embodiment of the present invention is, therefore, to deliver a device for fuel preheating which can be used in different gas turbine plants, and which can be adapted quickly and cost-effectively in terms of its heating capacity to a predetermined fuel preheating requirement.

An object may be achieved in that fuel preheating takes place in fuel preheating stages which can be activated individually, as required, and through which the fuel can be conducted in succession.

By way of a device of this type, a high degree of standardization, along with a repetition effect, can be achieved in planning and implementation. Owing to the buildup of individual fuel preheating stages capable of being used, as required, various temperature ranges can be set in stages, depending on the arrangement and number of fuel preheating stages and their connection to the steam generator or steam generators. A modular construction is thus possible, so that the device can be used for various gas/steam turbine plants or can be adapted by way of simple modifications (modular effect).

If fuel preheating takes place in a first stage (for example with condensate recirculation), then complete utilization of the feedwater quantity for fuel preheating may be achieved when the feedwater preheater is constructed from two parts which are connected in parallel to the exhaust gas and the fuel preheating stage is connected between the parts, the feedwater delivery line leading from an outlet of the first part of the feedwater preheater to the fuel preheating stage, and the feedwater discharge line leading from the fuel preheating stage to an inlet of the second part of the feedwater preheater. In this device, the entire feedwater quantity first runs through part of the feedwater preheater, is heated and then flows through the fuel preheating stage, in which it gives off the previously absorbed heat completely or partially. Subsequently, the cooled feedwater runs through the second part of the feedwater preheater, in which it is heated again. There are therefore no losses due to throttlings which would take place if feedwater were branched off. Only relatively low pumping capacities are necessary. Advantageously, there is no need for any additional circulation of feedwater. The efficiency of the fuel preheating stage is thus correspondingly high.

As-required adaptation to the desired temperature of the fuel during fuel preheating is possible when a fuel preheating stage is assigned to a condensate preheater or to a medium-pressure feedwater preheater or to a high-pressure feedwater preheater. Thus, the different pressure and temperature ranges of the feedwater preheating stages can at the same time be utilized, without additional measures, for fuel preheating. In particular, the various stages may be combined with one another according to the heating requirement.

A particularly advantageous utilization of the feedwater energy in the steam generator is afforded when three fuel preheating stages are provided, a first fuel preheating stage being assigned to a condensate preheater, a second fuel preheating stage being assigned to a medium-pressure feedwater preheater and a third fuel preheating stage being assigned to a high-pressure feedwater preheater. The fuel can thereby be heated carefully, in stages, to a very high temperature. At the same time, it is necessary for the fuel preheating stage to have only one design which is adapted to the respectively prevailing pressure and temperature. Thus, in the case of the lower pressure stages, a less complicated design is possible with the result that safety is not restricted and, moreover, costs can be saved.

When the feedwater delivery line of a fuel preheating stage is attached to the feedwater pump downstream of the condensate preheater and the feedwater discharge line of the fuel preheating stage leads upstream of the condensate preheater, an additional condensate recirculation pump is not necessary on account of the pressure which is exerted by the feedwater pump.

There is no need for throttling to a low pressure level, for example about 4–5 bar, when the feedwater delivery line of a fuel preheating stage is attached downstream of a feedwater preheater and the feedwater discharge line of the fuel preheating stage leads upstream of the feedwater pump.

Flashings are insignificant when the feedwater delivery line of a fuel preheating stage is attached between the medium-pressure drum and the medium-pressure feedwater preheater and the feedwater discharge line of the fuel preheating stage leads to the low-pressure drum.

When the first and/or the second and/or the third fuel preheating stage are connected in each case between the two parts of the condensate preheater and/or the two parts of the medium-pressure feedwater preheater and/or the two parts of the high-pressure feedwater preheater, then, advantageously, no additional feedwater has to be circulated.

A slower startup with a lower temperature gradient is ensured when an admixing line, starting between the condensate pump and a shutoff valve, leads to the inlet of the feedwater into the fuel preheating stage. The quantity of admixed cooler feedwater can be set continuously, with the result that the temperatures are regulated.

A regulated startup in the medium-pressure fuel preheater is afforded when an admixing line is attached to an inlet of the fuel preheating stage by use of a medium-pressure feedwater delivery line, the admixing line starting between the feed pump and the medium-pressure feedwater preheater.

An aim of an embodiment of the invention is, furthermore, to improve a method for fuel preheating in combined gas and steam turbine plants. Feedwater in at least one steam generator is heated in a feedwater preheater or condensate preheater. It is evaporated in an evaporator and is superheated in a superheater. At least part of the heated feedwater is used for the preheating of fuel in a fuel preheater which is supplied with feedwater having a predetermined temperature by use of a feedwater delivery line. After the heating of the fuel, the cooled feedwater is discharged in each case by use of a feedwater discharge line.

An object, therefore in one embodiment, is to provide a method for fuel preheating in combined gas and steam turbine plants, which can be used in different gas turbine plants and in which the heating capacity of the fuel preheater can be adapted quickly and cost-effectively to a predetermined fuel preheating requirement.

An object directed at an embodiment of a method may be achieved by fuel preheating taking place in fuel preheating stages which can be activated individually, as required, and through which the fuel is conducted in succession. By the fuel being heated in stages, a flexible and virtually optimum setting of the fuel preheating temperatures to the requirements of the plants is possible and at the same time is cost-effective because not all the components used have to satisfy all the pressure and temperature requirements at the same time, but only those requirements actually prevailing locally in each case.

When the feedwater is conducted first through one part of the feedwater preheater, subsequently to the fuel preheating stage and through a second part of the feedwater preheater, the two parts being connected in parallel to the exhaust gas, the feedwater is first heated directly to the desired temperature. Subsequently, the entire heated feedwater quantity can be utilized for heating the fuel. Thereafter, the cooled feedwater is heated again in the second part of the feedwater preheater. There are therefore no pressure losses on account of throttlings or possible heat losses due to prolonged diversion. When feedwater from a condensate preheater is conducted through a first fuel preheating stage, feedwater from a medium-pressure feedwater preheater is conducted through a second fuel preheating stage and feedwater from a high-pressure feedwater preheater is conducted through a third fuel preheating stage. The individual temperature and pressure states of the feedwater are utilized particularly advantageously and the individual fuel preheating stages have to be geared in each case only to the requirements of one stage, with the result that costs can be saved (modular construction).

BRIEF DESCRIPTION OF THE DRAWINGS

Exemplary embodiments of the invention are given in the figures of which.

DETAILED DESCRIPTION OF THE PREFERRED EMBODIMENTS

Figure 1:
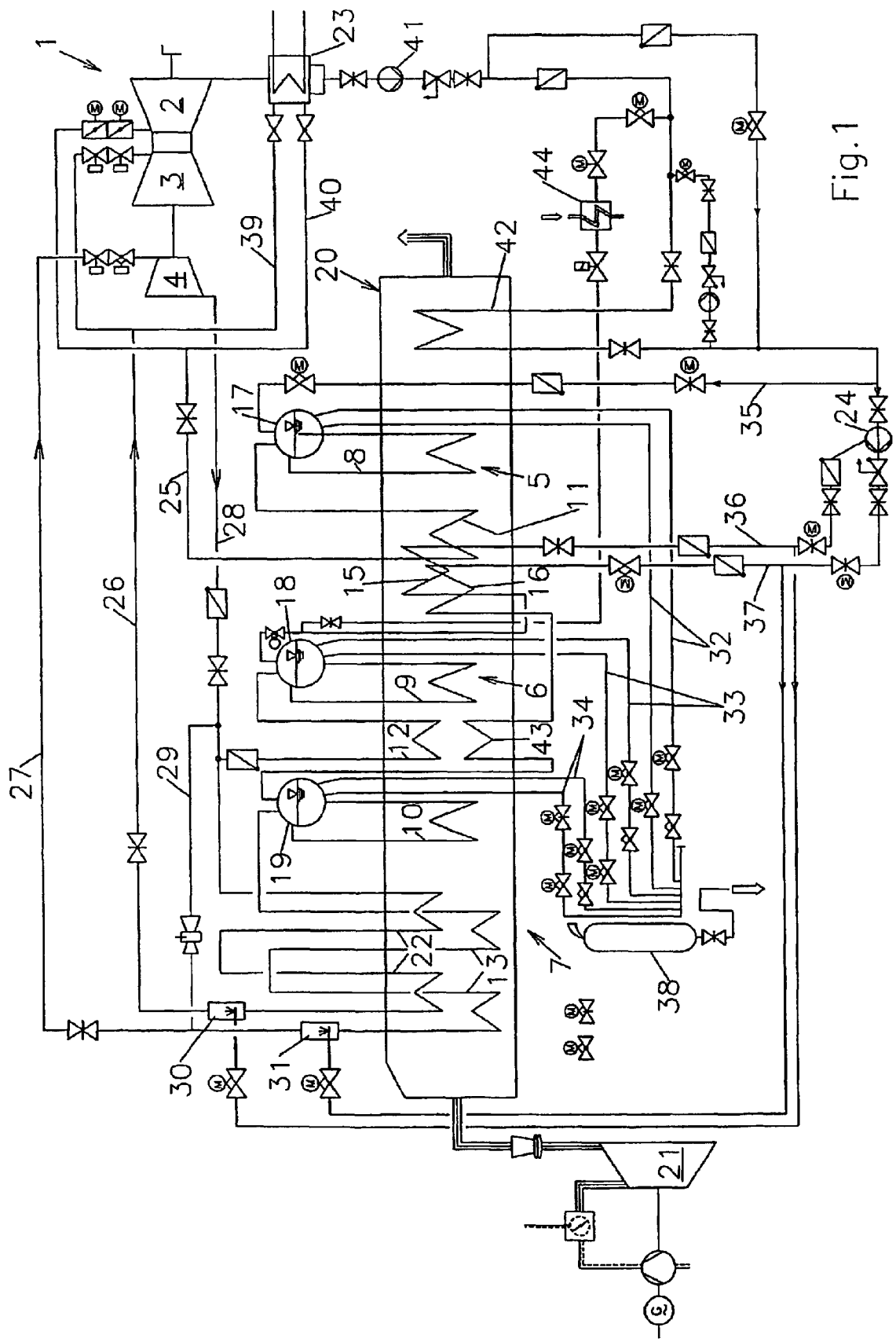
FIG. 1: shows a diagrammatic illustration of a gas and steam turbine plant.

FIG. 1 shows a diagrammatic illustration of a gas and steam turbine plant. The steam turbine 1 is constructed from three turbine stages 2, 3, 4, to be precise a low-pressure steam stage 2, a medium-pressure steam stage 3 and a high-pressure steam stage 4. The turbine stages 2, 3, 4 are supplied with steam by way of three steam generators 5, 6, 7, to be precise a low-pressure steam generator 5, a medium-pressure steam generator 6 and a high-pressure steam generator 7.

The steam generators 5, 6, 7 are basically of similar construction. The steam generators 5, 6, 7 include, in each case, an evaporator 8, 9, 10, of a superheater 11, 12, 13, of a condensate preheater 42 or a feedwater preheater 15, 16 and of a drum 17, 18, 19 in which feedwater condensate and feedwater steam collects, and also of a heat source 20 which, in the present case, is fed by exhaust gases from a gas turbine 21.

The feedwater is first preheated in a condensate preheater 42. Thereafter, part of the feedwater is branched off and is led through a low-pressure feedwater delivery line 35 to a low-pressure drum 17. Another part of the feedwater is led from a feedwater pump 24, via a medium-pressure feedwater delivery line 36, to a medium-pressure drum 18 and, via a high-pressure feedwater delivery line 37, to a high-pressure drum 19. From the drums 17, 18, 19, saturated steam is first generated from the feedwater in the low-pressure evaporator 8, in the medium-pressure evaporator 9 or in the high-pressure evaporator 10. This is then followed, in the low-pressure steam generator 5, by the low-pressure superheater 11, in which the saturated steam is heated to the desired superheating temperature.

From the low-pressure superheater 11, a low-pressure turbine delivery line 25 leads the steam to the low-pressure turbine stage 2 or, in a bypass mode, through a low-pressure steam bypass line 40 into a turbine condenser 23, in which the steam is condensed again and is conducted by means of a condensate pump 41 to the condensate preheater 42. In the medium-pressure steam generator 6, the feedwater is first heated in the medium-pressure feedwater preheater 15, and, subsequently, saturated steam is generated in the medium-pressure evaporator 9, which is then conducted to the medium-pressure superheater 12. The superheated steam is subsequently fed into a high-pressure turbine discharge line 28 which carries steam which has emerged from the high-pressure turbine part 4 and which then, together with the medium-pressure steam, is further superheated in a medium-pressure intermediate superheater 22 and is subsequently conducted, via a medium-pressure turbine delivery line 26, to the medium-pressure steam stage 3 of the steam turbine 1.

Alternatively, the medium-pressure steam may be supplied to the turbine condenser 23 via a medium-pressure steam bypass 39. The feedwater supplied to the high-pressure steam generator 7 is heated first in a high-pressure feedwater preheater 16 and thereafter in a further high-pressure feedwater preheater 43. The saturated steam generated in the high-pressure evaporator 10 is superheated in the two stages of the high-pressure superheater 13 and is supplied to the high-pressure steam stage 4 of the steam turbine 1 via a high-pressure turbine delivery line 27. Alternative steam conduction may take place via the high-pressure steam bypass 29 which connects the high-pressure turbine delivery line 29 to the high-pressure turbine discharge line 28. Drum water can be discharged from all the drums 17, 18, 19 into a common tank 38 via low-pressure drum discharge lines 32, medium-pressure drum discharge lines 33 and high-pressure drum discharge lines 34. Moreover, the superheated medium-pressure steam and the superheated high-pressure steam can be cooled by feedwater extracted downstream of the feedwater pump being supplied in each case into a medium-pressure steam deheater 30 or high-pressure steam deheater 31 (injection cooler) built respectively into the medium-pressure turbine delivery line 26 or the high-pressure turbine delivery line 27.

Moreover, electrical valves or flaps are installed in most lines, so that the steam and feedwater flows can be controlled.

For generating the gases for operating the gas turbine 21, fuel, for example natural gas or fuel oil, is required. For fuel preheating, heated feedwater from the medium-pressure steam generator 6 is used in the prior art, as illustrated in FIG. 1. After preheating in the medium-pressure feedwater preheater 15, the feedwater is conducted to a fuel preheater 44. In the fuel preheater 44, the heat energy from the feedwater is transmitted to the fuel in countercurrent on the heat exchanger principle. Subsequently, the cooled feedwater is fed into the feedwater circuit again upstream of the condensate preheater 42. During fuel heating, the feedwater is cooled to 60–80° C., while the fuel is heated up to 200° C. This high preheating cannot always be utilized, since, in the case of higher preheating of the fuel, problems, such as, for example, what may be referred to as "combustion chamber humming", may arise during combustion in the combustion chamber of the gas turbine 21.

Figure 2:
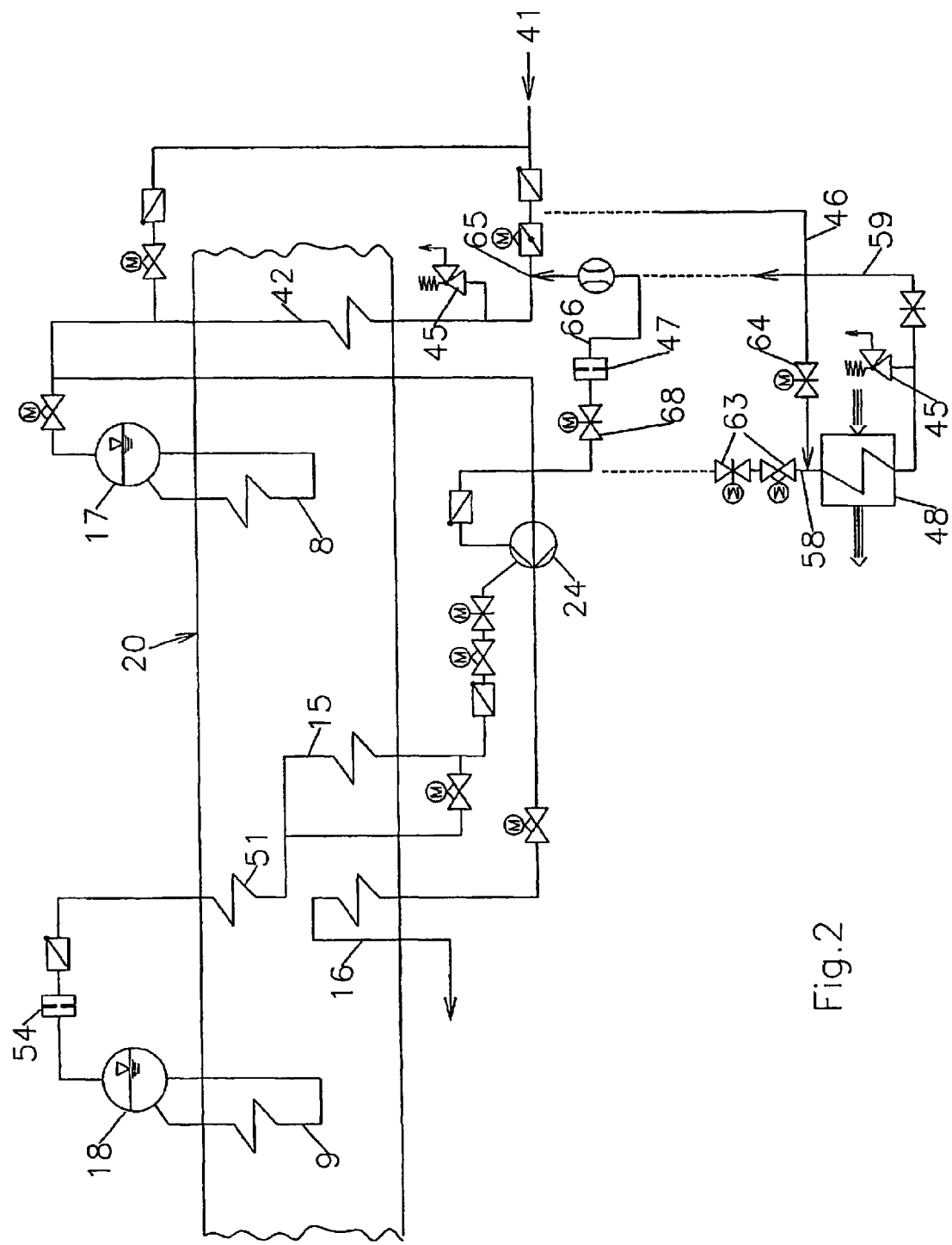
FIG. 2: shows a fuel preheating stage.

FIG. 2 shows a fuel preheating stage 48 according to an embodiment of the invention. By use of a low-pressure feedwater delivery line 58 which extracts low-pressure feedwater from a tap of the high-pressure feed pump, the feedwater heated by the condensate preheater 42 is conducted to the fuel preheating stage 48. After the heating of the fuel in the heat exchanger in the fuel preheating stage 48, the feedwater is introduced upstream of the condensate preheater 42 through a low-pressure feedwater discharge line 59. Valves 63 with an electronic actuating drive are provided in the low-pressure feedwater delivery line 58, so that the run of the feedwater can be shut off or set. To safeguard against destruction due to excess pressure, a pressure relief valve 45 is provided.

For careful startup with a lower temperature gradient, an admixing line 46 is provided. The admixing line 46 starts upstream of the condensate preheater 42, even upstream of the introduction point 65 of the feedwater cooled for fuel preheating. The admixing line ends upstream of the fuel preheating stage 48 and has a regulatable valve 64. Moreover, the entire fuel preheating stage 48, together with the low-pressure feedwater delivery line 58, with low-pressure feedwater discharge line 59 and with the admixing line 46, is provided as a retrofit system, so that it can be used, as required. Parallel to the low-pressure feedwater delivery line 58 and the low-pressure feedwater discharge line 59 and to the fuel preheating stage 48, a parallel feedwater line 66 runs from the feedwater pump 24 to upstream of the condensate preheater 42. Set up in this parallel feedwater line 66, in addition to a further valve 68, is a throttle diaphragm 47, with the aid of which the higher feedwater pressure (in the case of a bypassed fuel preheater) is reduced to the level of the condensate system.

Figures 3A, 3B:
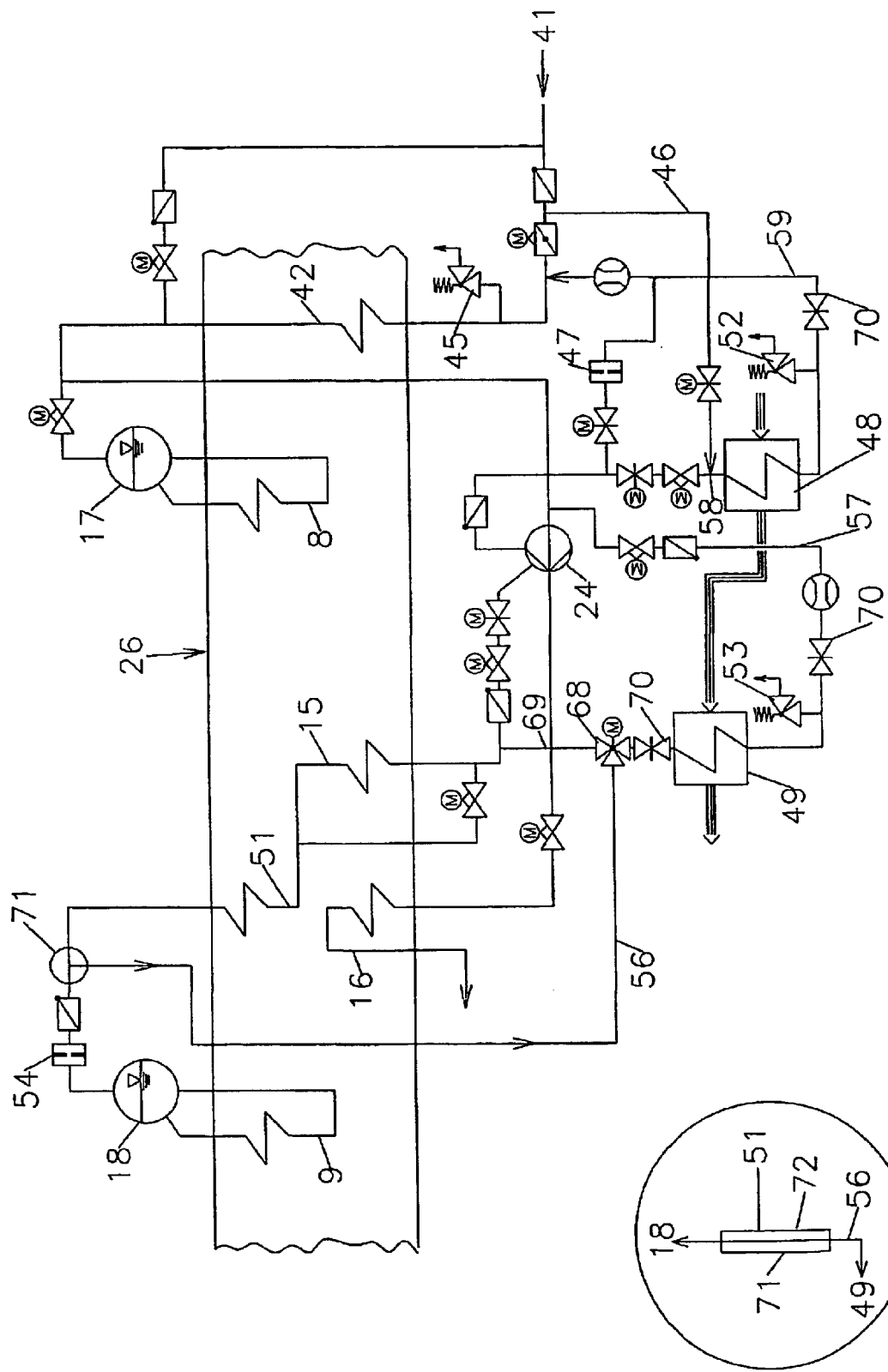
FIG. 3a: shows two fuel preheating stages.
FIG. 3b: shows a detail of the water/steam separation device.

FIG. 3a shows an extract of a circuit diagram of a gas and steam turbine plant with two fuel preheating stages 48, 49. The low-pressure fuel preheating stage 48 is attached, as described in FIG. 2. The fuel heated in the fuel preheating stage 49 is subsequently fed to a second fuel preheating stage, the medium-pressure preheating stage 49. This is supplied by use of a medium-pressure feedwater delivery line 56 with feedwater which is extracted downstream of the medium-pressure feedwater preheater 15, 51. The medium-pressure feedwater preheater 15, 51 is in this case constructed from two parts 15 and 51 connected in series. The introduction of cooler feedwater, which is extracted usptream of the first medium-pressure feedwater preheater 15, upstream of the second medium-pressure feedwater preheater 51 prevents flashing in the second medium-pressure feedwater preheater 51. This may be relevant, in particular, in the case of a relatively low throughflow, for example when the medium-pressure fuel preheating stage 49 is not in operation.

A throttle diaphragm 54 is provided between the medium-pressure drum 18 and the start of the medium-pressure feedwater delivery line 56. The aim of this device is to avoid flashings in the medium-pressure preheater 51 due to pressure buildup during steam formation. Furthermore, there is a steam-bubble separator 71, the functioning of which is explained in more detail in the illustration of a detail in FIG. 3b. Upstream of the fuel preheating stage 49, via a three-way valve 68, the delivery of colder feedwater via a delivery line 69 issuing upstream of the medium-pressure feedwater preheater 15 is possible for the purpose of a careful startup. The discharge of the cooled feedwater downstream of the fuel preheating stage 49 takes place via a medium-pressure feedwater discharge line 57 which issues upstream of the feedwater pump 24. This medium-pressure feedwater discharge line 57 has a pressure relief valve 53 for safeguarding against pressure excess. Pressure rating has to take place merely in terms of condensate preheating pressure, for example 25–30 bar. If no fuel preheating is desired, the feedwater delivery lines to the fuel preheating stages 48, 49 may be shut off, as required, by means of plurality of valves 70.

FIG. 3b shows an illustration of the steam bubble separator 71 in the form of a detail. Flashings may occur, for example, due to the fact that feedwater is excessively supersaturated with steam, for example when the feedwater temperature or the pressure falls. By use of the steam-bubble separator 71, the flow of the feedwater flowing in from the medium-pressure feedwater preheater 51 is slowed, and steam bubbles possibly present rise vertically upward, from where they are then entrained to the medium-pressure drum 18. The feedwater without bubbles collects in the lower steam-bubble separator part 72 and is drawn off here, via the medium-pressure feedwater delivery line 56, to the fuel preheating stage 49.

Figure 3C:
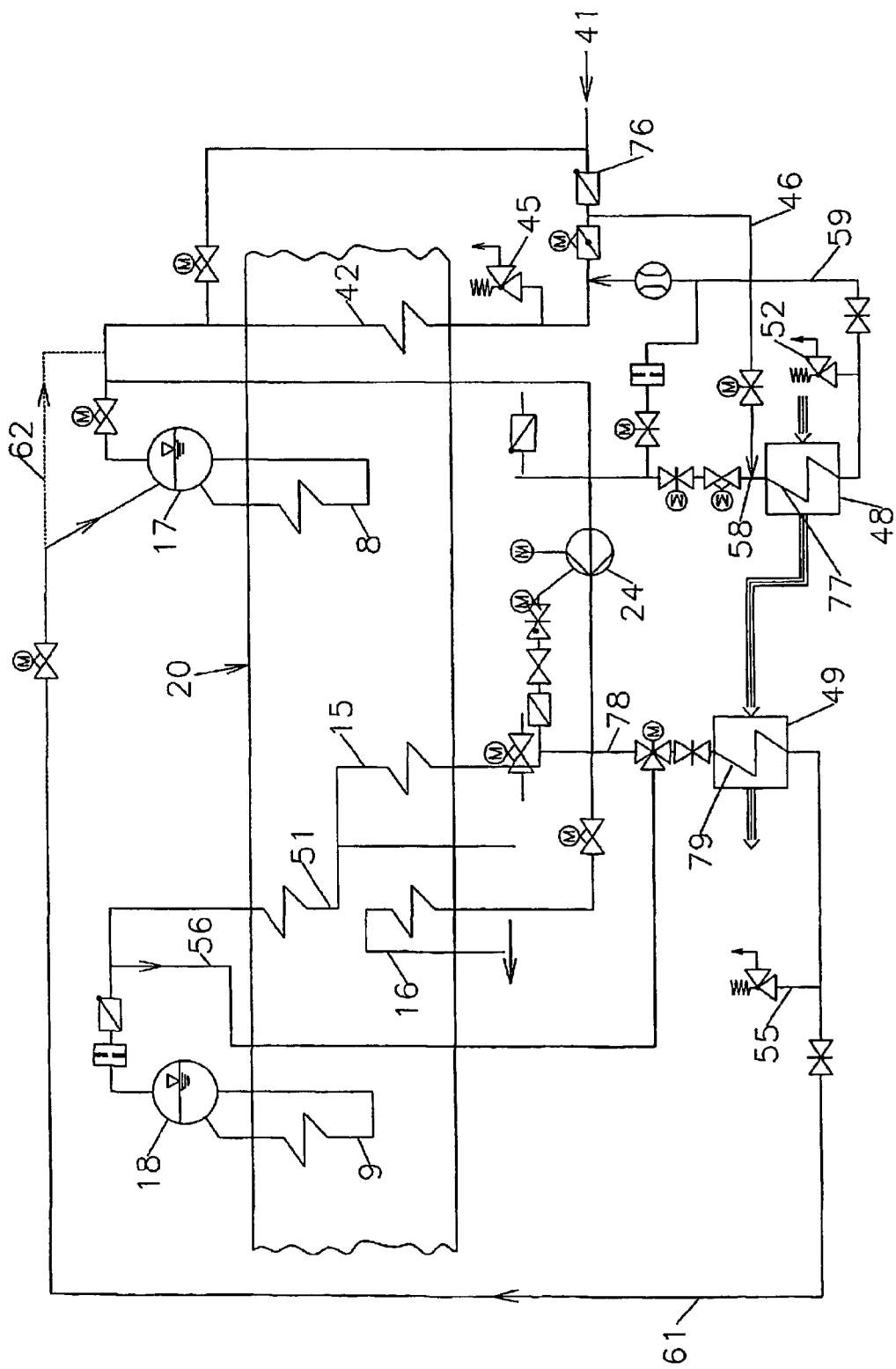
FIG. 3c: shows two fuel preheating stages with alternative line routing.

FIG. 3c shows an extract from a circuit diagram of a gas and steam turbine plant with two fuel preheating stages 48, 49. The first fuel preheating stage 48 corresponds to that in FIG. 3a. The medium-pressure feedwater discharge line 61/62 of the second fuel preheating stage 49 runs to the low-pressure drum 17. This results in less significant flashing problems, because the feedwater is still very hot.

Figure 4:
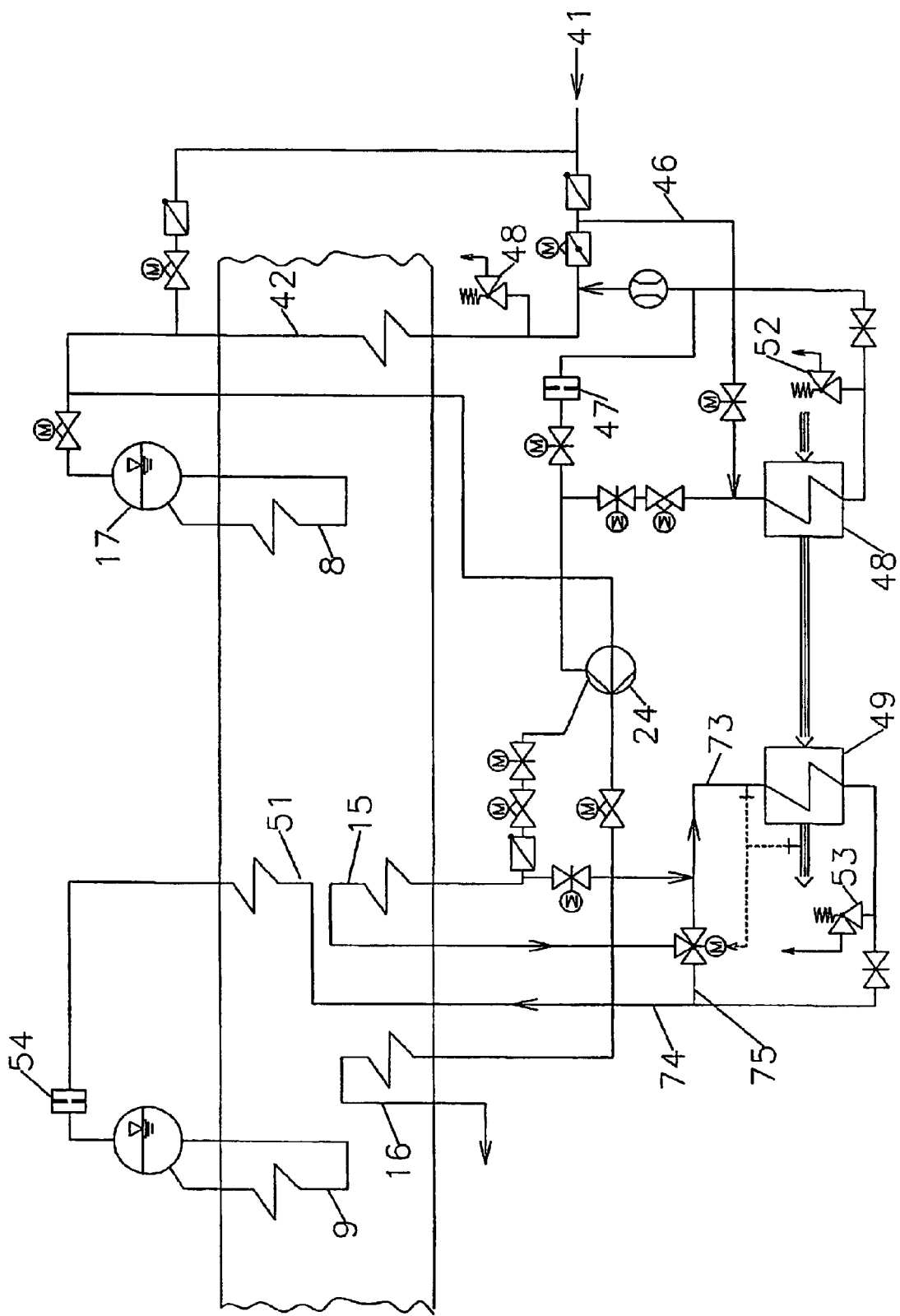
FIG. 4: shows two fuel preheating stages.

FIG. 4 shows an extract from a circuit diagram of a gas and steam turbine plant with two fuel preheating stages 48, 49. The medium-pressure feedwater preheater is constructed from two parts 15, 51 which are connected in parallel to the exhaust gas. The fuel preheating stage 49 is connected between the parts 15, 51 of the medium-pressure feedwater preheater, the feedwater delivery line 73 leading from an outlet of the first part 15 of the feedwater preheater to the fuel preheating stage 49, and the feedwater discharge line 74 leading from the fuel preheating stage 49 to an inlet of the second part 51 of the feedwater preheater. Provided parallel to the fuel preheating stage 49 is a bypass line 75, through which the feedwater can be conducted, in so far as it is not to flow through the fuel preheating stage 49.

Figure 5:
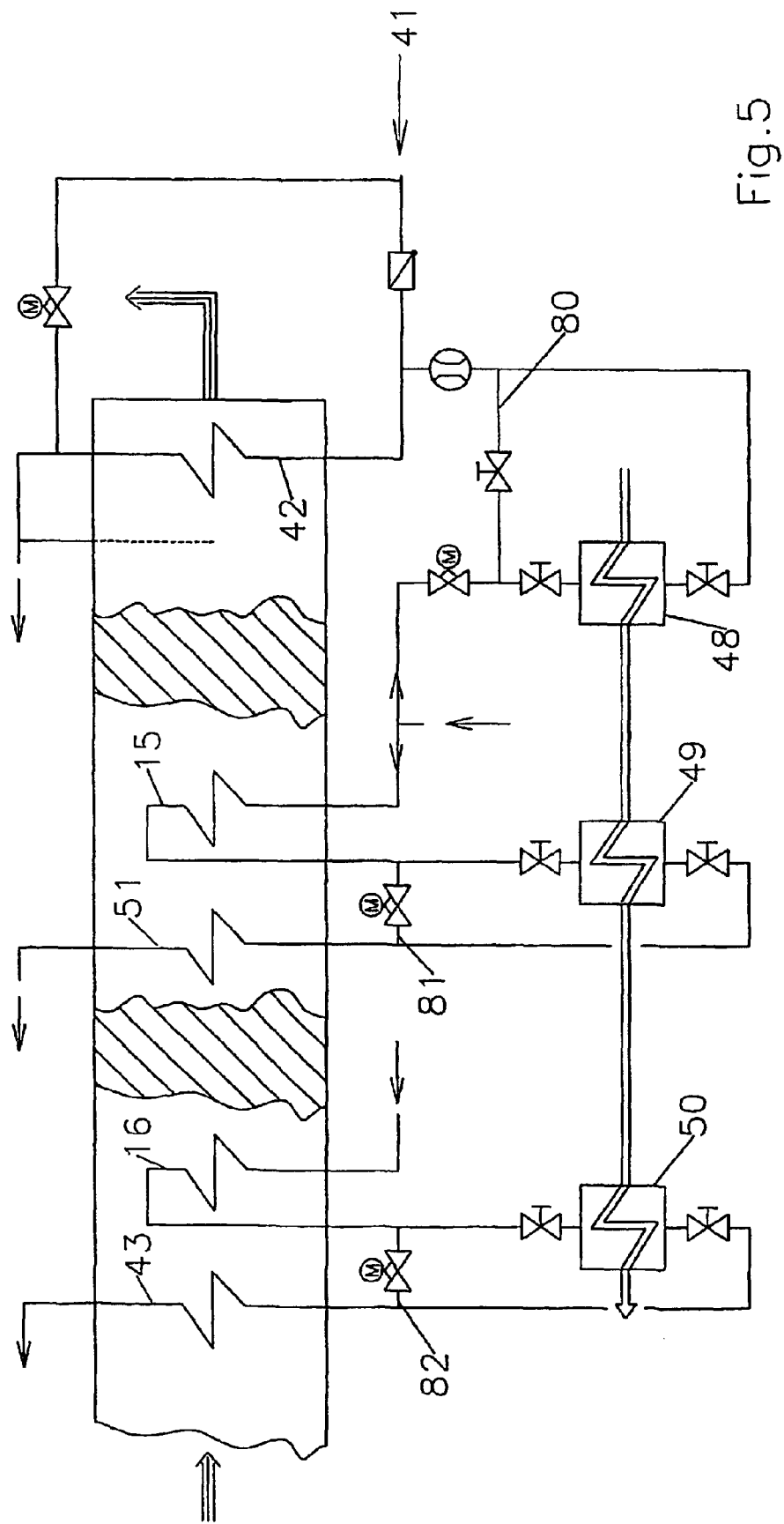
FIG. 5: shows three fuel preheating stages.

FIG. 5 shows an extract from a circuit diagram of a gas and steam turbine plant with three fuel preheating stages 48, 49, 50. The first fuel preheating stage 48 is fed by feedwater from the region upstream of the medium-pressure feedwater preheater 15. The second fuel preheating stage 49 is connected between the two parts 15 and 51 of the medium-pressure feedwater preheater, and the third fuel preheating stage 50 is connected between the two parts 16 and 43 of the high-pressure feedwater preheater. The fuel is in this case heated in the first stage 48 to approximately 130–150° C. It is heated in the second stage 49 to 200–220° C. and in the third stage 50 to approximately 300° C. The fuel preheaters are in each case capable of being bridged by feedwater lines 80, 81, 82 and can thus be bypassed, if this is necessary.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for fuel preheating in a combined gas and steam turbine installation, comprising:

at least one steam generator including a feedwater preheater, an evaporator and a superheater, and including three fuel preheating stages arranged in series and adapted to be individually activated as required;

a feedwater delivery line adapted to supply at least part of heated feedwater to the fuel preheating stages; and a feedwater discharge line adapted to discharge at least part of the feedwater from the fuel preheating stages, wherein via the feedwater delivery line, a first fuel preheating stage is coupled to a condensate preheater, a second fuel preheating stage is coupled to a medium-pressure feedwater preheater and a third fuel preheating stage is coupled to a high-pressure feedwater preheater.

2. The device as claimed in claim 1, wherein the medium-pressure feedwater preheater is constructed from two parts, and wherein the second fuel preheating stage is connected between the parts, the feedwater delivery line being connected to an outlet of the first part of the feedwater preheater and to the second fuel preheating stage, and the feedwater discharge line being connected to the second fuel preheating stage and to an inlet of the second part of the feedwater preheater.

3. The device as claimed in claim 1, wherein the feedwater delivery line of the first fuel preheating stage is attached to a feedwater pump downstream of the condensate preheater, and the feedwater discharge line of the first fuel preheating stage leads upstream of the condensate preheater.

4. The device as claimed in claim 3, wherein the feedwater delivery line at the second fuel preheating stage is attached downstream of the medium-pressure feedwater preheater, and the feedwater discharge line of the second fuel preheating stage leads upstream of the feedwater pump.

5. The device as claimed in claim 1, wherein the feedwater delivery line of the second fuel preheating stage is attached between a medium-pressure drum and the medium-pressure feedwater preheater, and the feedwater discharge line of the second fuel preheating stage is connected to a low-pressure drum.

6. The device as claimed in claim 1, wherein the feedwater delivery line of the second fuel preheating stage is attached between a medium-pressure drum and the medium-pressure feedwater preheater, and the feedwater discharge line of the second fuel preheating stage is attached between the condensate preheater and a low-pressure drum.

7. The device as claimed in claim 1, wherein at least one of the condensate water preheater, and the medium-pressure feedwater preheater and the high-pressure feedwater preheater are designed in two parts, and wherein at least one of the first fuel preheating stage is connected between the two parts of the condensate water preheater, the second fuel preheating stage is connected between the two parts of the medium-pressure feedwater preheater and the third fuel preheating stage is connected between the two parts of the high-pressure feedwater preheater.

8. The device as claimed in claim 1, wherein an admixing line is attached between a condensate pump and a shutoff valve and leads to an inlet of the feedwater into the first fuel preheating stage.

9. The device as claimed in claim 8, wherein a further admixing line is attached to a further inlet of the second fuel preheating stage via a medium-pressure feedwater delivery line, the further admixing line starting between the feed pump and the medium-pressure feedwater preheater.

10. A method for fuel preheating in a combined gas and steam turbine installation, comprising:
heating feedwater in a steam generator in at least one of a feedwater preheater and a condensate preheater;
evaporating the feedwater in an evaporator; and
superheating the feedwater in a superheater, wherein at least part of the heated feedwater is used for the preheating of fuel in a fuel preheater which is supplied with feedwater of a predetermined temperature via a feedwater delivery line, and wherein, after the heating of the fuel, the cooled feedwater is discharged in via a feedwater discharge line, the fuel preheating taking place in fuel preheating stages adapted to be activated, as required, and the fuel being conducted in succession through the fuel preheating stages, and wherein feedwater from a condensate preheater is conducted through a first fuel preheating stage, feedwater from a medium-pressure feedwater preheater is conducted through a second fuel preheating stage and feedwater from a high-pressure feedwater preheater is conducted through a third fuel preheating stage.

11. The method as claimed in claim 10, wherein the feedwater is conducted first through a first part of the medium-pressure feedwater preheater, subsequently through a feedwater delivery line to the second fuel preheating stage and thereafter through a feedwater discharge line to a second part of the medium-pressure feedwater preheater.

12. The device as claimed in claim 1, wherein the feedwater delivery line of the first fuel preheating stage is attached to a feedwater pump downstream of the condensate preheater, and the feedwater discharge line of the first fuel preheating stage leads upstream of the condensate preheater.

13. The device as claimed in claim 2, wherein the feedwater delivery line of the second fuel preheating stage is attached between a medium-pressure drum and the medium-pressure feedwater preheater, and the feedwater discharge line of the second fuel preheating stage is connected to a low-pressure drum.

14. The device as claimed in claim 2, wherein the feedwater delivery line of the second fuel preheating stage is attached between a medium-pressure drum and the medium-pressure feedwater preheater, and the feedwater discharge line of the second fuel preheating stage is attached between the condensate preheater and a low-pressure drum.

15. The device as claimed in claim 3, wherein the feedwater delivery line of the second fuel preheating stage is attached between a medium-pressure drum and the medium-pressure feedwater preheater, and the feedwater discharge line of the second fuel preheating stage is connected to a low-pressure drum.

16. The device as claimed in claim 3, wherein the feedwater delivery line of the second fuel preheating stage is attached between a medium-pressure drum and the medium-pressure feedwater preheater, and the feedwater discharge line of the second fuel preheating stage is attached between the condensate preheater and a low-pressure drum.

17. The device as claimed in claim 2, wherein at least one of the condensate water preheater, and the medium-pressure feedwater preheater and the high-pressure feedwater preheater are designed in two parts, and wherein at least one of the first fuel preheating stage is connected between the two parts of the condensate water preheater, the second fuel preheating stage is connected between the two parts of the medium-pressure feedwater preheater and the third fuel preheating stage is connected between the two parts of the high-pressure feedwater preheater.

18. The device as claimed in claim 2, wherein an admixing line is attached between a condensate pump and a shutoff valve and leads to an inlet of the feedwater into the first fuel preheating stage.

19. The method of claim 10, wherein the method is for fuel preheating in a combined gas and steam turbine installation with the aid of a device, comprising:
at least one steam generator including a feedwater preheater, an evaporator and a superheater, and including three fuel preheating stages arranged in series and adapted to be individually activated as required;
a feedwater delivery line adapted to supply at least part of heated feedwater to the fuel preheating stages; and
a feedwater discharge line adapted to discharge at least part of the feedwater from the fuel preheating stages,
wherein via the feedwater delivery line, a first fuel preheating stage is coupled to a condensate preheater, a second fuel preheating stage is coupled to a medium-pressure feedwater preheater and a third fuel preheating stage is coupled to a high-pressure feedwater preheater.

20. A device for fuel preheating in a combined gas and steam turbine installation, comprising:
at least one steam generator including a feedwater preheater, an evaporator and a superheater, and including three fuel preheating stages arranged in series and adapted to be individually activated as required;
feedwater delivery means for supplying at least part of heated feedwater to the fuel preheating stages; and
feedwater discharge means for discharging at least part of the feedwater from the fuel preheating stages,
wherein via the feedwater delivery means, a first fuel preheating stage is coupled to a condensate preheater, a second fuel preheating stage is coupled to a medium-pressure feedwater preheater and a third fuel preheating stage is coupled to a high-pressure feedwater preheater.

* * * * *